(12) United States Patent
Zheng (10) Patent No.: US 12,130,474 B2
(45) Date of Patent: Oct. 29, 2024

(54) LINEAR N×N ROBOTIC FIBER OPTIC SWITCH

(71) Applicant: Xuezhe Zheng, San Diego, CA (US)

(72) Inventor: Xuezhe Zheng, San Diego, CA (US)

(73) Assignee: Jenluk LLC, San Diego, CA (US)

( * ) Notice: Subject to any disclaimer, the term of this patent is extended or adjusted under 35 U.S.C. 154(b) by 879 days.

(21) Appl. No.: 17/189,969

(22) Filed: Mar. 2, 2021

(65) Prior Publication Data
US 2021/0311261 A1 Oct. 7, 2021

Related U.S. Application Data

(60) Provisional application No. 63/005,454, filed on Apr. 6, 2020.

(51) Int. Cl.
*H04Q 1/14* (2006.01)
*G02B 6/35* (2006.01)
*H04Q 11/00* (2006.01)

(52) U.S. Cl.
CPC ......... *G02B 6/3502* (2013.01); *G02B 6/3546* (2013.01); *H04Q 1/147* (2013.01); *H04Q 11/0003* (2013.01)

(58) Field of Classification Search
CPC .... G02B 6/3502; G02B 6/3546; H04Q 1/147; H04Q 11/0003
See application file for complete search history.

(56) References Cited

U.S. PATENT DOCUMENTS 5,581,644 A * 12/1996 Saito .................... G02B 6/3825
385/20
2021/0409846 A1* 12/2021 Leigh ................. H04Q 11/0005

OTHER PUBLICATIONS

Xuezhe Zheng, et al., "3D MEMS Photonic Cross-connect Switch Design and Performance", IEEE Journal of Selected Topics in Quantum Electronics, vol. 9, No. 2, p. 571-578, 2003.

* cited by examiner

*Primary Examiner* — Leslie C Pascal (57) ABSTRACT

A linear N×N robotic fiber optic switch is described. Notably, fiber adapters for connecting the input and output fibers are arranged linearly. Moreover, each fiber adaptor is driven by a push-pull mechanism such that it can be positioned to a front, center, or back position, with which the private plane of a fiber port can be separated from the other fiber ports and fiber connection can be configured using a simple linear translation robotic pickup free of interference in a compact space. Furthermore, a large scale fabric switch comprises 3 stages of N linear N×N robotic switches connected using fiber shuffles. Each stage or all three stages can share one robot to reduce cost. Scalability to large port counts may be accomplished proportional to N, the number of ports, rather than $N^2$.

9 Claims, 5 Drawing Sheets

LINEAR N×N ROBOTIC FIBER OPTIC SWITCH

CROSS-REFERENCE TO RELATED APPLICATIONS

The application claims the benefit of PPA Ser. Nr. 63/005,454, filed 2020 Apr. 6 by the present inventor, which is incorporated by reference.

BACKGROUND

Field

The disclosed embodiments generally relate fiber optic switches, specifically to automated linear N×N fiber optical switches having means that allow scalable low-cost, low insertion loss, and fiber entanglement-free fiber cross-connects.

Related Art

The world is more and more connected with optical fibers. IT networking innovations have been mostly applied to layers 1 to 6 of the communication networks while the physical interconnects layer remains unchanged for decades. As the IT infrastructure scales to meet the ever-growing application and service demands, the scale of the physical connectivity layer in data centers, telecom central offices, and wireless networks is quickly becoming a huge challenge for manual service and management. An emerging need is a "smart" physical connectivity layer which can help IT services with software-defined networking to better utilize the resources and achieve lower cost.

Automated fiber optic cross-connects are the key element to realize a "smart" physical connectivity layer. Over the past couple of decades, various optical switches have been developed for automated fiber cross-connects, but none meets the performance requirements of all the applications in terms of optical loss, switching time and scale. For active networking, circuit switching time in milliseconds and below is a must. The optical loss is also preferred to be less than 3 dB as the standard transceivers are typically made for a link loss budget not considering the additional loss from the insertion of a fiber cross-connect element. 3D MEMS and collimator steering switching technologies are more suitable as they have reasonably fast switching on the order of a few 10s of milliseconds, and reasonably low loss on the order of 2~3 dB (see X. Zheng et al, "Three-Dimensional MEMS Photonic Cross-Connect," IEEE J. Sel. Top. Quantum Electron., vol. 9, no. 2, pp. 571-578, 2003; and U.S. Pat. No. 7,095,916 to Hagood et al.).

However, for applications like automated fiber patch panels or optical distribution frames (ODFs), the switching time is less critical as the fiber patching is traditionally done manually. But the optical loss of each connection has to be very low, e.g. less than 1 dB preferred. Besides, latching is typically required once a fiber connection is made for this type of application to guarantee reliable physical connections against power outage, earthquake, etc.

For a low cost, low loss fiber switching with latching, robotic fiber switching is an excellent solution. Various prior arts described mechanized large port count fiber cross-connect approaches in which fiber optic connections are reconfigured by a robotic fiber handler. In U.S. Pat. No. 6,307,983 to Goosen, a fiber optic switch utilizing a circular fiber bundle and a circular ferrule loader ring is described. Satio et al. describe the use of a robotic fiber handler to mechanically reconfigure connectors on a coupling board in U.S. Pat. No. 5,613,021. Moreover, U.S. Pat. No. 5,784,515 to Tamaru et al. describes a fiber optic switch in which connectorized optical fibers are exchanged between an "arrangement board" and a "connection board by a motorized fiber handler.

To overcome the susceptibility to fiber entanglement of the aforementioned prior arts, U.S. Pat. No. 6,859,575 to Arol et al. describes robotic cross-connect switches comprised of N input optical fibers supported by N translation stages arranged in parallel rows and M output fibers supported by M translation stages arranged in parallel columns. Row and column translation stages are configured perpendicular to one another. Each fiber requires a shared or dedicated mechanical actuator to linearly translate both parallel to (x, y) and perpendicular to (z) the switch planes. The connectors require individual z translation to physically contact the opposing facets of aligned input and output fibers. An extension of this cross-connect approach is disclosed in U.S. Pat. No. 7,702,193 to Arol et al. for improved density and scale using customized fiber connectors (fiber-end carriages) and two shared fiber movers for the input and output fibers respectively. Since connections are made between fiber-end carriages located in any row and column mating at the $N^2$ insertion points of a 2D latching matrix, the scalability is still limited. And the cost is relatively high because it requires customized connectors, special 2D mating matrix, and two robots for both the input and output fibers.

To overcome the scale limit of prior arts, U.S. Pat. No. 80,868,715 to A. S. Kewitsch describes scalable and modular automated fiber optic-cross-connect systems in which connection reconfiguration control algorithm based on the Theory of Knots and Braids is used to achieve automated cross-connect with reconfigurability in a completely non-blocking fashion and scalable to a large port count of >1000. Only a single robotic pickup head is required for reconfiguration. However, the algorithm to avoid fiber entanglement requires complex operations to "weave" the end-point of fiber lines along a route in a 2D plane, resulting in long switching time in practice. On average it would take a few minutes to connect an input port to an arbitrary output port.

In conclusion, the robotic fiber cross-connect approaches described in the prior arts have failed to achieve low cost, low loss, scalability and fast switching simultaneously.

Hence what is needed is an automated all-fiber cross-connect systems with reliable low-loss latched connections, scalability to large port counts (>100 to 1000's and proportional to N, the number of ports, rather than $N^2$), compact form factor and low cost.

SUMMARY

In accordance with one embodiment, a linear N×N robotic fiber switch comprises a robot and an N×N linear optical core in which fiber adapters for connecting the first and the second fiber connectors are arranged linearly. N fiber connectors of the first fiber group are inserted orderly into the fiber connectors in the parking section, while N fiber connectors of the second fiber group are inserted orderly into the fiber connectors in the connection section initially. A connection from a first fiber in the first group to a second fiber in the second group is accomplished by moving the corresponding fiber connector of the first fiber to the fiber connector where the second fiber is located, and inserting it into the corresponding fiber adaptor using the robotic pickup of the robot. Each fiber adaptor is driven by a push-pull mechanism such that it can be moved to a front, center, or back position, with which the private planes of the fiber ports can be moved away from that of the fiber to be configured to open up a clear space for it to move free of interference. Thus an N×N non-blocking fiber crossconnect can be accomplished simply using a linear translation robot. Moreover, a large scale fabric switch comprises 3 stages of N linear N×N robotic switches connected using fiber shuffle. Each stage or all three stages can share one robot to reduce cost. Scalability to large port counts (>1000's and proportional to N, the number of ports, rather than $N^2$) is accomplished.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter herein in any way. Other features, aspects, and advantages of the subject matter described herein will become apparent from the following Detailed Description, Figures, and Claims.

BRIEF DESCRIPTION OF THE FIGURES

The above-mentioned advantages and other features of the present invention will become more apparent to and the invention will be better understood by people skilled in the art with reference to the following description of the preferred embodiments of the invention taken in conjunction with the accompanying drawings, wherein.

ADVANTAGES

Accordingly, several advantages of one or more aspects are as follows: to provide automated fiber optic crossconnect system that is free of fiber entanglement, that can be easily implemented with a simple control algorithm in a compact form factor, that provides reliable low loss fiber connections, that has relatively fast switching time, that can be scalable to >1000's fiber port counts, that is relatively inexpensive, that can be easily manufactured. Other advantages of one or more aspects will be apparent from a consideration of the drawings and ensuing description.

DETAILED DESCRIPTION

The following description is presented to enable any person skilled in the art to make and use the present embodiments and is provided in the context of a particular application and its requirements. Several embodiments of the present disclosure are illustrated by way of example, and not by limitation below. In the figures of the accompanying drawings, elements having the same reference numeral designations represent like elements throughout. The drawings are not to scale unless otherwise noted.

It is to be understood that all terminologies and phraseology used herein are for the purpose of illustrating, and should not be understood as limiting. The phrases such as "including", "comprising", "having" and other variations thereof are meant to encompass the items as described and their equivalents without excluding any additional items thereof.

A linear N×N robotic fiber optic switch is described. Notably, fiber adapters for connecting the input and output fibers are arranged linearly. Moreover, each fiber adaptor is driven by a push-pull mechanism such that it can be positioned to a front, center, or back position, with which the private plane of a fiber port can be separated from the other fiber ports and fiber connection can be configured using a simple linear translation robotic pickup free of interference in a compact space. Furthermore, a large scale fabric switch comprises 3 stages of N linear N×N robotic switches connected using fiber shuffles. Each stage or all three stages can share one robot to reduce cost. Scalability to large port counts may be accomplished proportional to N, the number of ports, rather than $N^2$.

This design facilitates automated non-blocking fiber switching in an ultra-compact fashion free of fiber entanglement. The modular design further enables seamless scaling to ultra-large scale switch fabric which is a critical component to a fully automated fiber physical layer that can be management intelligently.

Figure 1A:
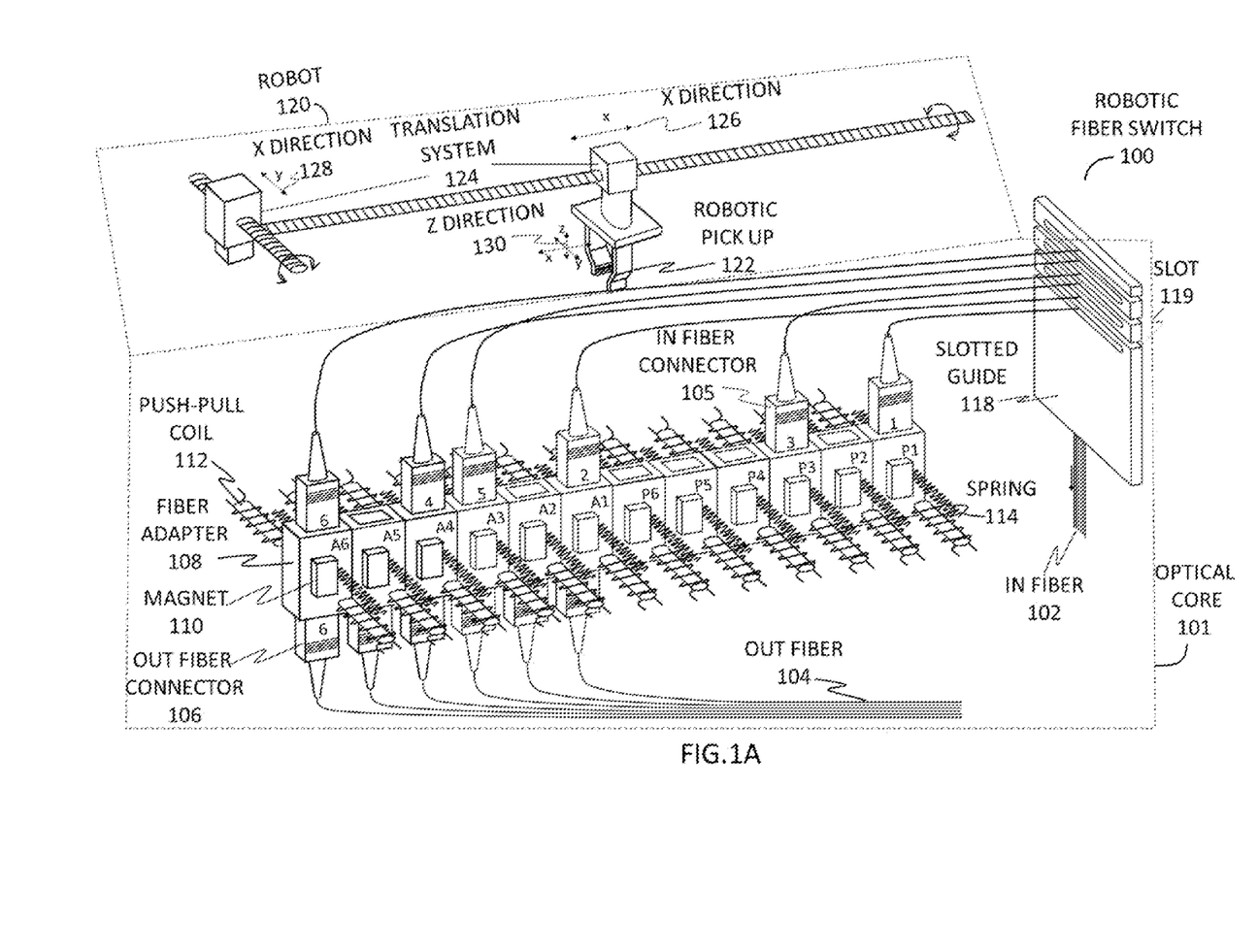
FIG. 1A is a drawing illustrating an example of a perspective view of a linear N×N robotic fiber switch in accordance with an embodiment of the present disclosure.

We now describe embodiments of the fiber optic switch. FIG. 1A is a perspective view of one version of a linear N×N robotic fiber switch 100 in accordance with one embodiment. It is comprised of an optical core 101 and a robot 120. In optical core 101, N in-fibers 102 from a first network and N out-fibers 104 to a second network (N=6 shown for clarity) are terminated with N in-fiber connectors 105 and N out-fiber connectors 106 inside of optical core 101, respectively. 2×N fiber adaptors 108, each with magnet 110 disposed to the back and front, are arranged linearly in a standby mode to form a one-dimensional array along an X-direction 126 in which N adaptors are for active connections and the other N adaptors are for parking. Each fiber adaptor 108 may be driven by a driving mechanism to move to a front, middle or back position along a Y-direction 128 perpendicular to X-direction 126 in operation. The driving mechanism may be comprised of push-pull coils 112 and spring 114 placed on both sides of fiber adapter 108. Out-fiber connectors 106 are inserted into N active fiber adapters in order, e.g. out-fiber connecter 106-1 to fiber adapter 108-A1, out-fiber connector 106-2 to fiber adaptor 108-A2, and so on so forth. In-fibers 102 are guided through a slotted guide 118 placed to the side of the fiber adaptor array with ordered slots 119 with self-tensioning, each occupying a different slot, e.g. in-fiber 102-1 through slot 119-1, in-fiber 102-2 through slot 119-2, and so on so forth. Slot 119-1 is the lowest while slot 119-N is the highest slot. In-fiber connectors 105 are inserted into N parking fiber adapters in order initially, e.g. in-fiber connector 105-1 to fiber adapter 108-P1, in-fiber connector 105-2 to fiber adapter 108-P2, and so on so forth. Tension on fiber 102 provides automatic bend radius control and keeps fiber straight to in-fiber connector 105. Robot 120 is comprised of a robotic pick up 122 mounted on a translation system 124. Robot 120 is placed directly above the array of fiber adapter 108. Robotic pick up 122 may move up to stay above all in-fibers 102 and move down in Z-direction 130 to reach in-fiber connector 105. Moreover, robotic pick up 122 may also move laterally in X-direction 126 and Y-direction 128 for fine alignment with in-fiber connector 105 or fiber adapter 108. Furthermore, the translation system 124 may move robotic pick up 122 along X-direction 12 to align with fiber adapter 108. It may also move robotic pickup 122 along Y-direction 128 to access another optical core 101.

A connection between an in-fiber 102-$i$ from the first network and an out-fiber 104-$j$ to a second network is made by coupling the in-fiber connector 105-$i$ with the out-fiber connector 106-$j$ via fiber adapter 108-A$j$. FIG. 1A shows four fiber connections, in-fiber 102-6 to out-fiber 104-6, in-fiber 102-4 to out-fiber 104-4, in-fiber 102-5 to out-fiber 104-3, and in-fiber 102-2 to out-fiber 104-1, while two fiber ports in-fiber 102-1 and in-fiber 103-3 remains in their parking fiber adaptor 108-P1 and 108-P3, respectively.

Figure 1B:
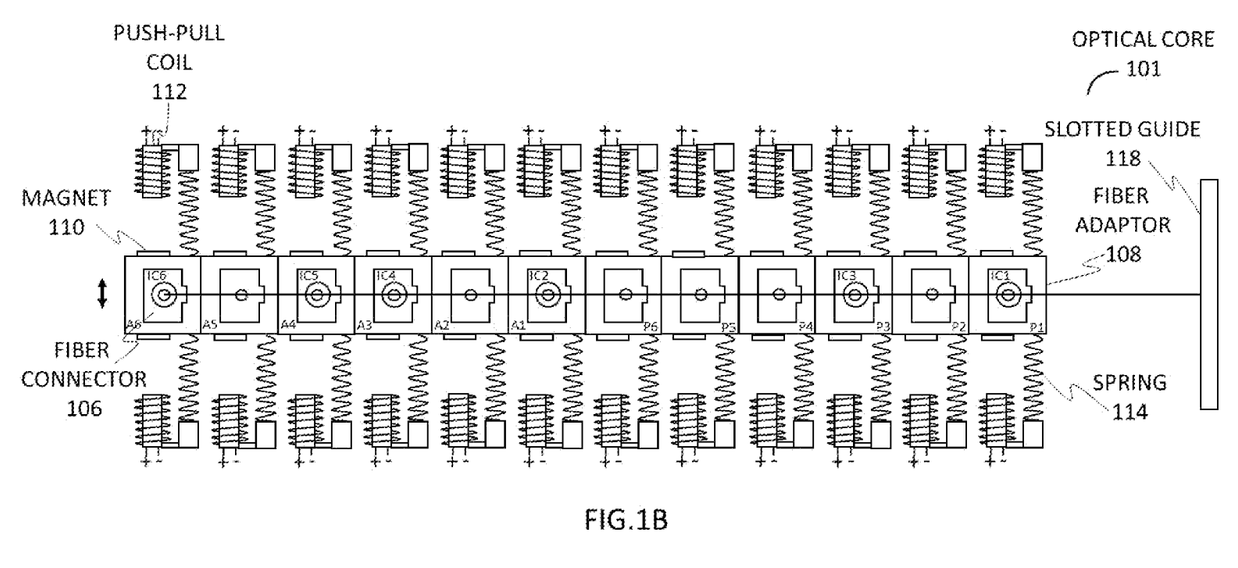
FIG. 1B is a drawing illustration an example of a top view of an optical core in standby mode of the linear N×N robotic fiber switch illustrated in FIG. 1A.

FIG. 1B shows a top view of the corresponding standby mode of optical core 101 with all the fiber adaptors 108 in the middle position. The controller system of robotic fiber switch 100 maintains a database of the fiber adaptors 108 status and tracks the location of the in-fiber connectors 105. Every time a new connection is made or removed, the location of in-fiber connector 105 is updated accordingly.

Figure 1C:
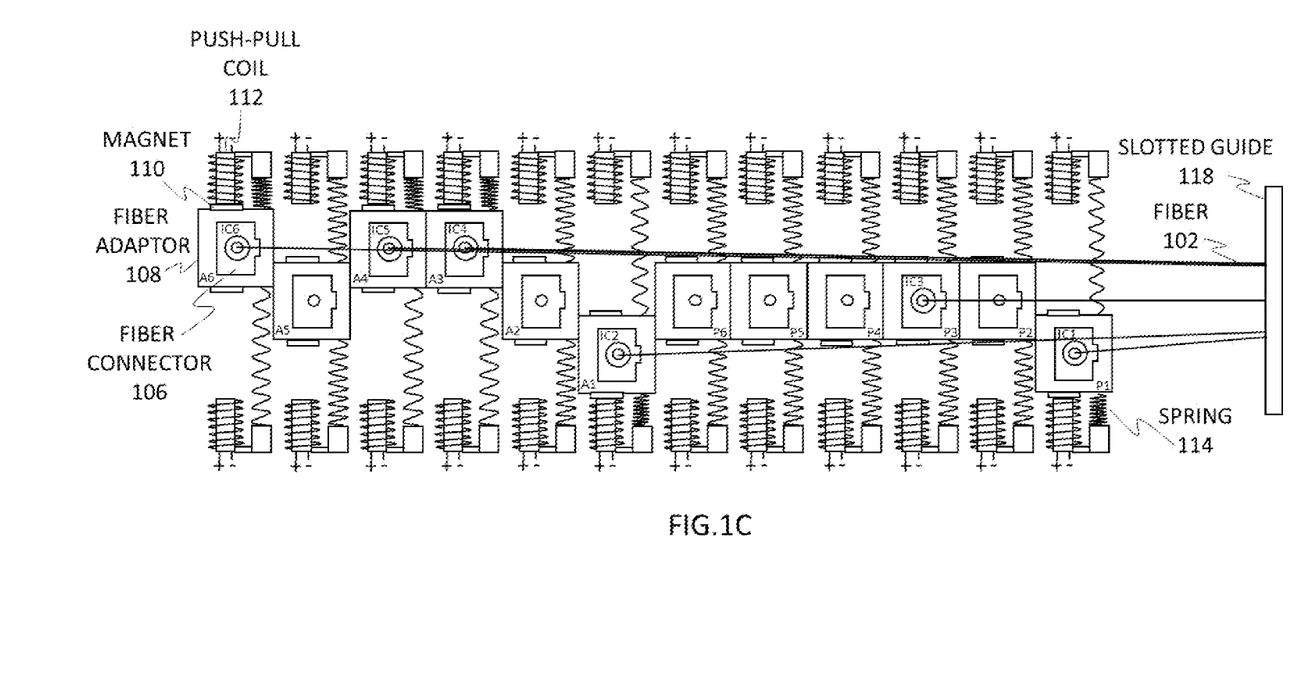
FIG. 1C is a drawing illustration an example of a top view of an optical core in operation mode of the linear N×N robotic fiber switch illustrated in FIG. 1A

Reconfiguration of the robotic fiber switch 100 requires moving the in-fiber connector 105 to a new fiber adapter. The centerline of an in-fiber connector 105 and its corresponding in-fiber 102 form a private plane. With all the in-fiber connectors 105 sitting in adapters 108 in a line in the standby mode, the private planes of in-fibers 102 overlap with each other. Moving an in-fiber connector 105, in this case, results in interference and fiber entanglement. Moving the private planes of the other fiber connectors away from that of the fiber connector of interest, however, can open up a clear space for it to move free of interference. Hence, non-interfering reconfiguration for an in-fiber connector 105-$i$ can be accomplished by moving the fiber adapters loaded with other in-fiber connector 106-$j$ (ji) to either front or back position to clear up the moving space for in-fiber connector 105-$i$. If port number j is smaller than port number i, then the corresponding fiber adapter loaded with in-fiber connector 105-$j$ is moved to the back position, otherwise to the front position, using the corresponding push-pull coils. FIG. 1C shows an example of such an operation to make a connection for in-fiber 102-3 to out-fiber 104-5. In-fiber connector 105-4,5,6 have port numbers larger than 3, hence their corresponding fiber adapter 108-A6, A4 and A3 are moved to their front positions. In-fiber connector 105-1,2 have port numbers smaller than 3, hence their corresponding fiber adapter 108-A1, and P1 are moved to their back positions. The rest of the fiber adaptors 108 remain in the center. Now the path for moving the in-fiber connector 105-3 is opened up. Robotic pick up 122 is then moved above fiber adapter 108-P3, grabs and pulls out in-fiber connector 105-3, moves to the destination, and inserts in-fiber connector 105-3 into fiber adapter 108-A5. Once the connection is complete, robotic pick up 122 is raised above all the in-fibers 102. And all the fiber adapters 108 moved out are moved back to the center positions.

Having its optical core 101 in a linear arrangement, robotic fiber switch 100 requires only one robotic pick up 122 and linear translation in one common trajectory for connection reconfiguration. Hence its control algorithm can be simple and consequently, reconfiguration can be relatively fast. With a simple dynamically reconfigurable 3-position connection point for each port, private clear space is created only for the fiber port to be reconfigured instead of providing it to all fibers at all times. Hence compact form-factor can be achieved.

In some embodiment, fewer fiber adapters 108 for parking may be used when disconnecting all connections is not required. The minimum number of fiber connectors for parking is one, in which case it is used as a buffer. To make a new connection, the in-fiber connector 105 of in the destination fiber adapter 108 needs to be moved to this parking fiber adapter first. The requested in-fiber connector 105 can then be moved to the destination fiber adapter.

In some embodiments, the fiber adapter driving mechanism may be implemented using a motor instead of magnets and push-pull coils to provide 3-position (fron, center and back) control.

Figure 2:
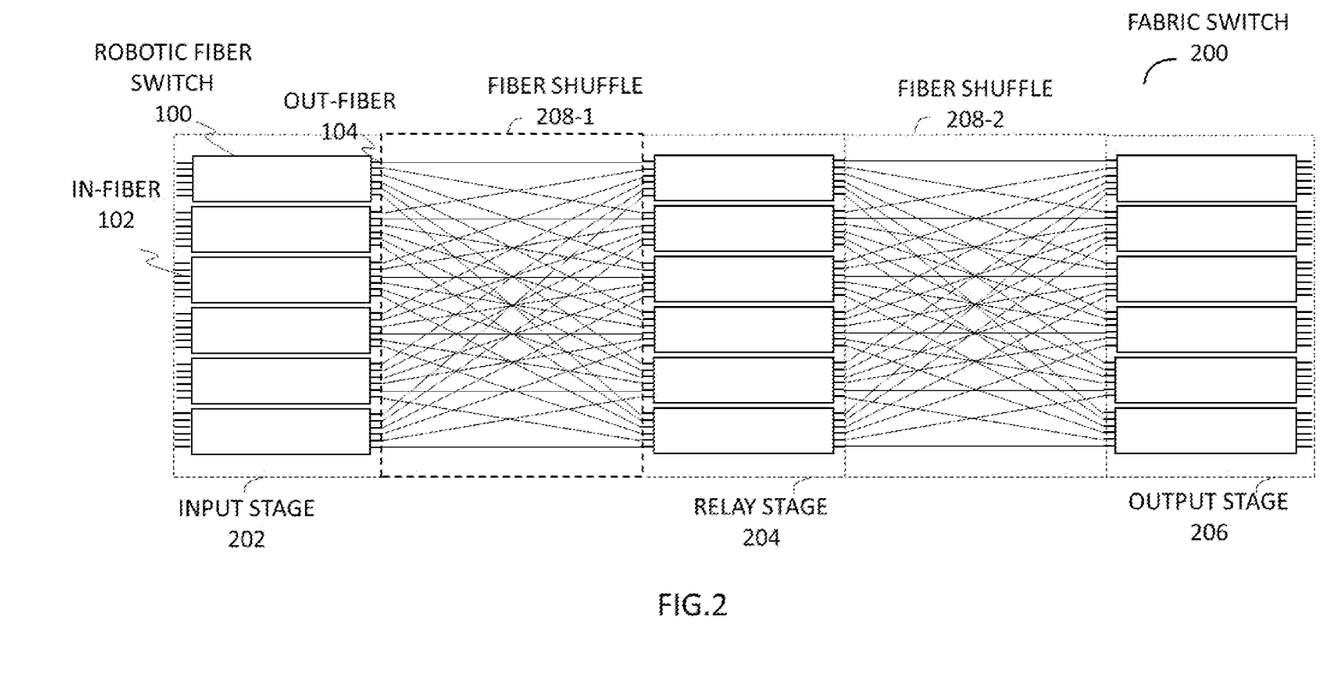
FIG. 2 is a diagram illustrating an example of a 3-stage large fabric switch in accordance with an embodiment of the present disclosure.

FIG. 2 shows a diagram of one version of a 3-stage large fabric switch 200 in accordance with one embodiment. It comprises three groups of robotic fiber switches 100, an input stage 202, a relay stage 204, and an output stage 206. Each stage consists of N N×N robotic fiber switches 100. The N×N out-fibers 104 of input stage 202 are connected to the N×N in-fibers of relay-stage 204 via a fiber shuffle 208-1, with which the ith out-fiber 104 of the jth robotic fiber switch 100 in input stage 202 is connected to the jth in-fiber 102 of the ith robotic fiber switch 100 in relay stage 204. The out-fibers 104 of relay stage 204 are connected to in-fibers 102 of output stage 206 via s second fiber shuffle 208-2 in s similar fashion, having the ith out-fiber 104 of the jth robotic fiber switch 100 in relay stage 204 connected to the jth in-fiber 102 of the ith robotic fiber switch 100 in output stage 206. N×N in-fibers 102 of N robotic fiber switches 100 in input stage 202 serve as the $N^2$ input ports of the $N^2 \times N^2$ fabric switch 200. Since every N×N robotic switch 100 in fabric switch 200 has its own robot 120, three stages can operate independently and multiple connections can be configured simultaneously.

Figure 3:
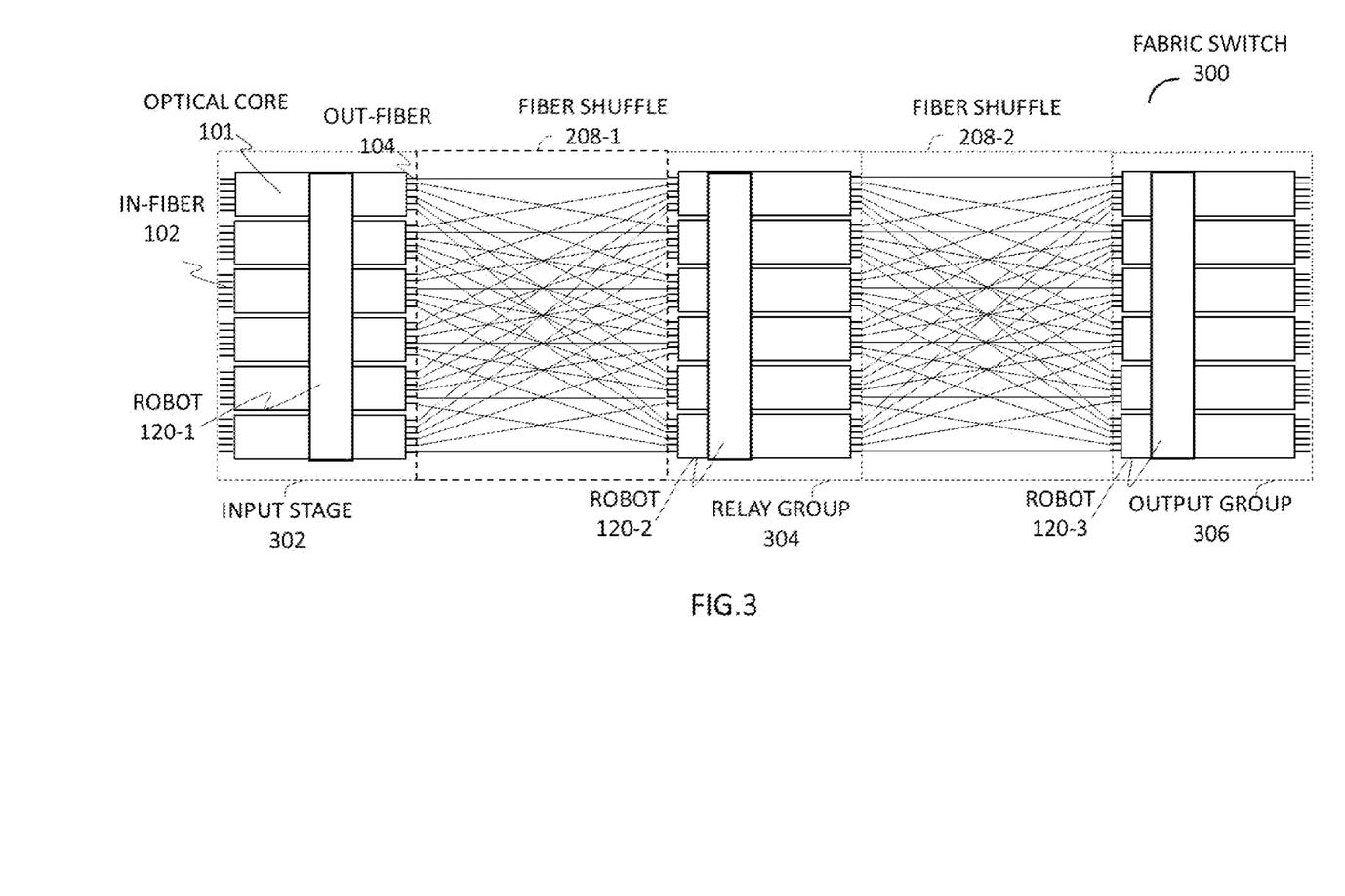
FIG. 3 is a diagram illustrating an example of a low-cost fabric switch in accordance with an embodiment of the present disclosure.

FIG. 3 shows a diagram of one version of a low-cost fabric switch 300 in accordance with one embodiment. It comprises three groups of optical cores 101, an input stage 302, a relay stage 304, and an output stage 306. Each stage consists of N rows of N×N optical core 101 arranged in one column in a plane. And all the optical cores 101 in each stage share one robot 120. Input stage 302, relay stage 304 and output stage 06 are connected in a fashion similar to fabric switch 200 via two fiber shuffles 208-1 and 2. Since there is one and only one robot in each stage, 3 stages still can configure its connection independently, but only one connection for fabric switch 400 can be configured at a given time. With shared robot 120 in each stage, the overall cost of the fabric switch 300 may be reduced substantially. And the switching time for any individual connection of fabric switch 300 remains the same as fabric switch 200.

To further reduce the cost, the three stages of fabric switch 300 can be arranged in one single column in a plane, and share one robot 120, in which case the three stages has to be configured in serial to configure a connection for the fabric switch. Hence the switching time will be 3 times longer.

Moreover, while the preceding discussion included some numerical values, these values are for the purposes of illustration and are not intended to be limiting. In other embodiments, different numerical values may be used.

In the preceding description, we refer to 'some embodiments.' Note that 'some embodiments' describes a subset of all of the possible embodiments, but does not always specify the same subset of embodiments.

What is claimed is:

1. A module, comprising:
an optical core, wherein:
the optical core comprises a first fiber group, each fiber within the group terminated by a fiber connector; and
the optical core comprises a second fiber group, each fiber within the group terminated by a fiber connector; and
the optical core comprised a linear fiber adaptor array, wherein:
the linear fiber adaptor array has a first half as the connection section with the number of fiber adaptors equals to the number of fibers in the first fiber group, and a second half as the parking section with the number of connectors equals to the number of fibers in the first fiber group; and
the optical core comprises a push-pull mechanism for driving an associated
fiber adaptor to a front, center, or back position to separate the translation plane of an associated fiber connector; and
the optical core comprises a fiber guide,
wherein:
the fiber guide comprises of guiding slots arranged sequentially with the number equals to the number of fibers; and
the fiber guide is placed vertically relative to the linear fiber adaptor array close to the parking side;
wherein each fiber in the first fiber group is self-tensioned and routed through a fiber guiding slot; and
each fiber connector of the second fiber group is inserted into an unoccupied fiber adaptor in the connection section of the fiber adaptor array from the bottom side, and
the fiber connectors of the first fiber group are inserted sequentially into the parking section of the fiber adaptor array from the top side initially in the order of their corresponding fiber guiding slot position, and relocated to the connection section of the fiber adaptor array to make a connection to a fiber connector of the second fiber group for reconfiguration by a robot; and
the robot placed above the optical core, wherein:
the robot comprises a translation system, wherein:
the translation system is operable to translate along the direction of the fiber adaptor array; and
the robot comprises a robotic pickup driven by the translation system, wherein:
the robotic pickup is operable to move 3 dimensions; and
the robotic pickup is operable to grab, and pull out or insert a specific fiber connector of the first fiber group from or to a specific fiber adaptor;
wherein when providing a fiber connection from a first fiber in the first fiber group to a second fiber in the second fiber group, the push-pull mechanism moves associated fiber adaptors which separates the translation plane of the optical connector of the first fiber from the other fiber connectors in the first fiber group before the robot relocates the optical connector of the first fiber to the optical adaptor connected to the fiber connector of the second fiber in the second fiber group to provide a connection free of interference.

2. The module of claim 1, wherein:
the push-pull mechanism comprises a pair of magnets attached to the front and backside of the optical adaptor; and
the push-pull mechanism comprises push-pull coils and springs placed to the front and backside of the optical adaptor.

3. The module of claim 1, wherein the push-pull mechanism comprises a linear translation structure driven by a motor.

4. The module of claim 1, wherein the parking section of the fiber adapter array contains fiber adapters less than the number of the fibers in the first fiber array, but not less than 1.

5. The module of claim 1, wherein the fibers in the first and the second fiber group are multi-core fibers.

6. The module of claim 1, wherein each fiber inf the first and the second fiber group is a fiber cord that comprises multiple fibers.

7. A system, comprising:
three stages which include an input stage, a relay stage, and an output stage, wherein:
each stage comprises N optical cores, wherein:
each optical core comprises a first fiber group with N fibers, each fiber within the group terminated by a fiber connector; and
each optical core comprises a second fiber group with N fibers, each fiber within the group terminated by a fiber connector; and
each optical core comprised a linear fiber adaptor array, wherein:
the linear fiber adaptor array has a first half as the connection section with the number of fiber adaptors equals to the number of fibers in the first fiber group, and a second half as the parking section with one or more connectors; and
each fiber adaptor is driven by a push-pull mechanism to a front, center, or back position; and
each optical core comprises a push-pull mechanism for driving an associated fiber adaptor to a front, center, or back position to separate the translation plane of an associated fiber connector; and
each optical core comprises a fiber guide, wherein;
the fiber guide comprises of guiding slots arranged sequentially with the number equals to the number of the fibers; and
the fiber guide is placed vertically relative to the linear fiber adaptor array close to the parking side;
wherein each fiber in the first fiber group is self-tensioned and routed through a fiber guiding slot; and
each fiber connector of the fibers in the second fiber group is inserted into an unoccupied fiber adaptor in the connection section of the fiber adaptor array from the bottom side, and
the fiber connectors of the first fiber group are inserted sequentially into the parking section of the fiber adaptor array from the top side initially in the order of their corresponding fiber guiding slot positions, and relocated to the connection section of the fiber adaptor array to make a connection to a fiber connector of the second fiber group for reconfiguration by a robot; and one or more robots to configure the fiber connections for the stages, wherein:

each robot comprises a translation system, wherein:
the translation system is operable to translate along the direction of the fiber adaptor array and the direction perpendicular to the fiber adaptor array; and each robot comprises a robotic pickup driven by the translation system, wherein:
the robotic pickup is operable to move 3 dimensions; and
the robotic pickup is operable to grab, and pull out or insert a specific fiber connector of the first fiber group from or to a specific fiber adaptor; and a first fiber shuffle connects the output fibers of the input stage to the input fibers of the relay stage; and a second fiber shuffle connects the output fibers of the relay stage to the input fibers of the output stage.

8. The system of claim 7, wherein:
the push-pull mechanism comprises a pair of magnets attached to the front and backside of the optical adaptor; and
the push-pull mechanism comprises push-pull coils and springs placed to the front and backside of the optical adaptor.

9. The system of claim 7, wherein the push-pull mechanism comprises a linear translation structure driven by a motor.

* * * * *